US012330755B2

(12) United States Patent
Campbell

(10) Patent No.: US 12,330,755 B2
(45) Date of Patent: Jun. 17, 2025

(54) SURFBOARD AND SPRING ASSEMBLY

(71) Applicant: Stuart Douglas Campbell, Queensland (AU)

(72) Inventor: Stuart Douglas Campbell, Queensland (AU)

( * ) Notice: Subject to any disclaimer, the term of this patent is extended or adjusted under 35 U.S.C. 154(b) by 576 days.

(21) Appl. No.: 17/783,784

(22) PCT Filed: Dec. 4, 2020

(86) PCT No.: PCT/AU2020/051331
§ 371 (c)(1),
(2) Date: Jun. 9, 2022

(87) PCT Pub. No.: WO2021/119726
PCT Pub. Date: Jun. 24, 2021

(65) Prior Publication Data
US 2023/0012159 A1   Jan. 12, 2023

(30) Foreign Application Priority Data

Dec. 16, 2019 (AU) ................................. 2019101609
Dec. 16, 2019 (AU) ................................. 2019283772
Mar. 25, 2020 (AU) ................................. 2020202137

(51) Int. Cl.
*B63B 32/50* (2020.01)
*B32B 3/02* (2006.01)
(Continued)

(52) U.S. Cl.
CPC ................ *B63B 32/50* (2020.02); *B32B 3/02* (2013.01); *B32B 3/04* (2013.01); *B32B 3/30* (2013.01);
(Continued)

(58) Field of Classification Search
CPC ......... B63B 32/50; B63B 32/40; B63B 32/57; B63B 32/59; B63B 2231/52; B32B 3/02; B32B 3/04; B32B 3/30; B32B 5/02; B32B 5/18; B32B 5/245; B32B 5/26; B32B 2250/40; B32B 2250/44; B32B 2260/021;
(Continued)

(56) References Cited

U.S. PATENT DOCUMENTS 9,738,356 B2 * 8/2017 Peter ..................... B63B 32/53
10,696,361 B2 * 6/2020 Bowen .................... B32B 27/30
(Continued)

FOREIGN PATENT DOCUMENTS

AU    2018264099 A1    5/2019

OTHER PUBLICATIONS

International Search Report and Written Opinion for International Application No. PCT/AU2020/051331 dated Feb. 25, 2021, 7 pages long.

(Continued)

*Primary Examiner* — Anthony D Wiest
(74) *Attorney, Agent, or Firm* — Fresh IP PLC; Clifford D. Hyra; Aubrey Y. Chen

(57) ABSTRACT

A surfboard having a core, a first elongate spring member located adjacent an upper side of the core, and a second elongate spring member located adjacent a lower side of the core, wherein the first elongate spring member extends substantially from a nose portion of the surfboard to a tail portion of the surfboard.

10 Claims, 13 Drawing Sheets

(51) Int. Cl.
   *B32B 3/04* (2006.01)
   *B32B 3/30* (2006.01)
   *B32B 5/02* (2006.01)
   *B32B 5/18* (2006.01)
   *B32B 5/24* (2006.01)
   *B32B 5/26* (2006.01)
   *B63B 32/40* (2020.01)
   *B63B 32/57* (2020.01)
   *B63B 32/59* (2020.01)

(52) U.S. Cl.
   CPC .................. *B32B 5/02* (2013.01); *B32B 5/18* (2013.01); *B32B 5/245* (2013.01); *B63B 32/40* (2020.02); *B63B 32/57* (2020.02); *B63B 32/59* (2020.02); *B32B 5/26* (2013.01); *B32B 2250/40* (2013.01); *B32B 2250/44* (2013.01); *B32B 2260/021* (2013.01); *B32B 2260/046* (2013.01); *B32B 2262/101* (2013.01); *B32B 2262/106* (2013.01); *B32B 2266/0228* (2013.01); *B32B 2266/0278* (2013.01)

(58) Field of Classification Search
   CPC ........ B32B 2260/046; B32B 2262/101; B32B 2262/106; B32B 2266/0228; B32B 2266/0278
   See application file for complete search history.

(56) References Cited

U.S. PATENT DOCUMENTS

| | | |
|---|---|---|
| 10,894,583 B2 * | 1/2021 | Cheung ................ G01C 21/343 |
| 2008/0210137 A1 | 9/2008 | Cox |
| 2012/0322325 A1 | 12/2012 | Filen |
| 2017/0001694 A1 | 1/2017 | Hayward et al. |
| 2017/0190394 A1 | 6/2017 | Cheung |

OTHER PUBLICATIONS

Written Opinion for International Application No. PCT/AU2020/051331 dated Dec. 20, 2021, 7 pages long.

* cited by examiner

SURFBOARD AND SPRING ASSEMBLY

CROSS REFERENCE TO RELATED APPLICATIONS

This application is a national phase of International Patent Application No. PCT/AU2020/051331 filed Dec. 4, 2020, which claims the priority filing benefit of Australian Patent Application Nos. 2019283772 and 2019101609 filed Dec. 16, 2019, and Australian Patent Application No. 2020202137 filed Mar. 25, 2020, which are incorporated herein by reference in their entirety.

FIELD OF INVENTION

The present invention relates to a surfboard. The present invention has particular but not exclusive application for a surfboard with energy recovery. The patent specification describes this use but it is by way of example only and the invention is not limited to this use.

BACKGROUND OF THE INVENTION

Surfboards are typically made of polyurethane or polystyrene foam covered with layers of fiberglass cloth, and polyester or epoxy resin. The use of these materials results in a light and strong surfboard that is buoyant and manoeuvrable.

Fiberglass surfboards typically have a degree of flex. Flex allows a surfboard to build energy through turns by bending into a turn, this results in a greater vertical curve of the surfboard between the nose and the tail and stored energy. As the surfboard comes out of a turn, the surfboard snaps back to its original shape, releasing the stored energy and propelling the surfboard out of the turn.

However, there is typically a trade-off between strength and flexibility, with more flexible surfboards typically more likely to snap or lose their springiness over time.

Many surfboards have one or more stringers to increase the surfboard's overall strength. However, these stringers also reduce a surfboards flexibility. A single stringer down a board's centre will provide strength but less flexibility along the centre of the board and can lead to torsional flex which can slow down a surfboard. Some boards have two stringers, each close to a rail of the surfboard. Surfboards with two stringers are typically stronger than surfboards with a single stringer, with the flex coming from the centre of the surfboard with two stringers.

OBJECT OF THE INVENTION

It is an object of the present invention to overcome or at least alleviate one or more of the above mentioned problems with surfboards and/or provide the consumer with a useful or commercial choice.

SUMMARY OF THE INVENTION

In one aspect, the present invention broadly resides in a surfboard having
a core;
a first elongate spring member located adjacent an upper side of the core; and
a second elongate spring member located adjacent a lower side of the core;
wherein the first elongate spring member extends substantially from a nose portion of the surfboard to a tail portion of the surfboard.

Preferably, the core is made predominantly from a foamed material. Preferably the core is a foam core. Preferably the foamed material is polyurethane foam. In another embodiment, the foam is polystyrene foam. Preferably the polystyrene foam is expanded polystyrene foam. Alternatively, the polystyrene foam can be extruded polystyrene foam.

Preferably the core includes a channel in a top surface thereof to accommodate the first elongate spring member. Preferably the channel in the upper surface is located centrally relative to a longitudinal axis of the surfboard. Preferably the core includes a channel in a lower surface thereof to accommodate the second elongate spring member. Preferably the channel in the lower surface is located centrally relative to a longitudinal axis of the surfboard.

Preferably the channel in the upper surface extends substantially from the nose portion of the surfboard to the tail portion of the surfboard. Preferably the channel in the lower surface extends substantially from the nose portion of the surfboard to the tail portion of the surfboard. Preferably the channel in the upper surface has a depth of substantially between 1 mm to 5 mm. More preferably the channel in the upper surface has a depth of substantially between 1 mm to 3 mm. Preferably the channel in the lower surface has a depth of substantially between 1 mm to 5 mm. More preferably the channel in the lower surface has a depth of substantially between 1 mm to 3 mm.

Preferably the channel in the upper surface has a width of substantially between 30 mm to 200 mm. More preferably the channel in the upper surface has a width of substantially between 40 mm to 80 mm. Preferably the channel in the lower surface has a width of substantially between 30 mm to 200 mm. More preferably the channel in the lower surface has a width of substantially between 40 mm to 80 mm.

Preferably the channel in the upper surface tapers to a point at or towards the nose portion of the surfboard. Preferably the channel in the lower surface tapers to a point at or towards the nose portion of the surfboard. Preferably the channel in the lower surface tapers to a point towards the tail portion of the surfboard. In one embodiment, the channel in the upper surface tapers to a point at or towards the tail portion of the surfboard.

Preferably the first elongate spring member is made of a resilient material. In one embodiment, the first elongate spring member is made of a fibreglass composite material. Preferably the first elongate spring member is made of a fibreglass and resin composite material. In another embodiment, the elongate spring member is made of a carbon fibre composite material. Preferably the elongate spring member is made of a carbon fibre and resin composite material.

Preferably the first elongate spring member tapers from a thicker portion to a thinner portion towards the nose portion of the surfboard. Preferably the first elongate spring member tapers from a thicker portion to a thinner portion towards the tail portion of the surfboard. Preferably the first spring member has a width that is greater than the thickness of the first spring member. Preferably the width is in the direction of the rails of the surfboard.

Preferably the first elongate spring member has a thickness of substantially between 1 mm to 5 mm. More preferably the first elongate spring member has a thickness of substantially between 1 mm to 3 mm.

Preferably the first elongate spring member has a width of substantially between 15 mm to 200 mm. Preferably the first elongate spring member has a width of substantially between 15 mm to 80 mm. More preferably the first elongate spring member has a width of substantially between 20 mm to 40 mm.

Preferably the first elongate spring member tapers to a point at or towards the nose portion of the surfboard.

Preferably the first elongate spring member comprises a plurality of layers of resilient material. Preferably the number of layers of resilient material define the thickness of the first elongate spring member. Preferably the number of layers of resilient material is greater in a central portion of the first elongate spring member compare to the first elongate spring member towards the nose portion of the surfboard, and compared to the first elongate spring member towards the tail portion of the surfboard. Preferably the plurality of layers of resilient material is between 2 to 8 layers of resilient material. More preferably the plurality of layers of resilient material is between 4 to 6 layers of resilient material. Preferably in use, the inner layer(s) of resilient material towards the core are/is shorter than the outer layer(s) of resilient material. Preferably each layer of the plurality of layers of resilient material has a different length. Preferably the plurality of layers are bonded together to form the first elongate spring member. More preferably the plurality of layers are bonded together using an epoxy to form the first elongate spring member. Preferably a thin portion of the first elongate spring member is less than 50% of the thickness compared to a thick portion of the first elongate spring member. Preferably the thin portion includes 1 to 2 layers of resilient material. Preferably the thick portion includes 4 to 6 layers of resilient material.

In one embodiment, the first elongate spring member is pretensioned. Preferably the first elongate spring member is pretensioned in a first direction. Preferably the first elongate spring member is biased to bend away from the core. Alternatively the first elongate spring member is pretensioned in a second direction, biased to bend towards the core.

Preferably the first elongate spring member is formed in the channel in the upper surface of the core. Alternatively the first elongate spring member is pressed into the core to create the channel in the upper surface of the core.

Preferably the second elongate spring member is made of a resilient material. Preferably the second elongate spring member is made of a fibre and resin composite material. Preferably the fibre is substantially unidirectional. Preferably the fibre is substantially unidirectional in the longitudinal direction of the surfboard. In one embodiment, the second elongate spring member is made of a fibreglass composite material. Preferably the second elongate spring member is made of a fibreglass and resin composite material. In another embodiment, the second elongate spring member is made of a carbon fibre composite material. Preferably the second elongate spring member is made of a carbon fibre and resin composite material.

Preferably the second elongate spring member tapers from a thicker portion to a thinner portion towards the nose portion of the surfboard. Preferably the second elongate spring member tapers from a thicker portion to a thinner portion towards the tail portion of the surfboard. Preferably the second spring member has a width that is greater than the thickness of the second spring member. Preferably the width is in the direction of the rails of the surfboard.

Preferably the second elongate spring member has a thickness of substantially between 1 mm to 5 mm. More preferably the second elongate spring member has a thickness of substantially between 1 mm to 3 mm.

Preferably the second elongate spring member has a width of substantially between 15 mm to 200 mm. Preferably the second elongate spring member has a width of substantially between 15 mm to 80 mm. More preferably the second elongate spring member has a width of substantially between 20 mm to 40 mm.

Preferably the second elongate spring member tapers to a point at or towards the nose portion of the surfboard. Preferably the second elongate spring member tapers to a point at or towards the tail portion of the surfboard.

Preferably the second elongate spring member comprises a plurality of layers of resilient material. Preferably the number of layers of resilient material define the thickness of the second elongate spring member. Preferably the number of layers of resilient material is greater in a central portion of the second elongate spring member compare to the second elongate spring member towards the nose portion of the surfboard, and compared to the second elongate spring member towards the tail portion of the surfboard. Preferably the plurality of layers of resilient material is between 2 to 8 layers of resilient material. More preferably the plurality of layers of resilient material is between 4 to 6 layers of resilient material. Preferably in use, the inner layer(s) of resilient material towards the core are/is shorter than the outer layer(s) of resilient material. Preferably each layer of the plurality of layers of resilient material has a different length. Preferably the plurality of layers are bonded together to form the second elongate spring member. More preferably the plurality of layers are bonded together using an epoxy to form the second elongate spring member. Preferably a thin portion of the second elongate spring member is less than 50% of the thickness compared to a thick portion of the second elongate spring member. Preferably the thin portion includes 1 to 2 layers of resilient material. Preferably the thick portion includes 4 to 6 layers of resilient material.

In one embodiment, the second elongate spring member is pretensioned. Preferably the second elongate spring member is pretensioned in a first direction. Preferably the second elongate spring member is biased to bend towards the core. Alternatively the first elongate spring member is pretensioned in a second direction, biased to bend away from the core.

Preferably the second elongate spring member is formed in the channel in the lower surface of the core. Alternatively, the second elongate spring member is pressed into the core to create the channel in the lower surface of the core.

Preferably the first elongate spring member and the second elongate spring member are spaced from one another by the core. In another embodiment, the first elongate spring member and the second elongate spring member are connected by one or more connection members.

Preferably the surfboard includes a shell layer. Preferably the shell layer substantially covers the core. Preferably the shell layer substantially covers the first elongate spring member. Preferably the shell layer substantially covers the second elongate spring member. It will be understood that a shell layer may also be referred to as a skin layer. Preferably the shell layer includes a fibreglass and resin composite material. Alternatively or additionally the shell layer can include a carbon fibre and resin composite material. Preferably the shell layer is bonded to the core. Preferably the shell layer is bonded to the first elongate spring member. Preferably the shell member is bonded to the second elongate spring member.

Preferably the surfboard is between 170 cm to 260 cm in length. More preferably the surfboard is between 180 cm to 210 cm in length. Preferably the surfboard has a partially concave lower surface. Preferably the surfboard has a partially convex upper surface.

In another aspect, the present invention broadly resides in a surfboard having
- a core; and
- a first elongate spring member located adjacent an upper side of the core;
- wherein the first elongate spring member extends substantially from a nose portion of the surfboard to a tail portion of the surfboard, and wherein the first elongate spring member has a width which is greater than a thickness of the first elongate spring member.

Preferably the width is in the direction of rails of the surfboard.

Preferably the surfboard further includes a second elongate spring member located adjacent a lower side of the core.

In a further aspect, the present invention broadly resides in a method of manufacturing a surfboard, including the steps of
- shaping a foam core;
- forming a channel in a top surface of the foam core, the channel extending from a tail portion of the surfboard to a nose portion of the surfboard;
- inserting a first elongate spring member in the channel in the top surface of the foam core, such that the first elongate spring member is located adjacent the top surface of the core; and
- covering the foam core and the first elongate spring member with a shell layer.

Preferably the method further includes the step of forming a channel in a lower surface of the foam core, the channel extending from a tail portion of the surfboard to a nose portion of the surfboard. Preferably the method further includes the step of inserting a second elongate spring member in the channel in the lower surface of the foam core, such that the second elongate spring member is located adjacent the lower surface of the core.

Preferably the step of inserting a first elongate spring member in the channel in the top surface of the foam core includes forming the first elongate spring member in the channel in the top surface of the foam core.

Preferably the step of inserting a second elongate spring member in the channel in the lower surface of the foam core includes forming the second elongate spring member in the channel in the lower surface of the foam core.

Preferably the step of covering the foam core and the first elongate spring member with a shell layer includes covering the second elongate spring member with the shell layer.

Preferably the surfboard is a surfboard as described in this specification.

In another aspect, the present invention broadly resides in a surfboard having
- a core; and
- a second elongate spring member located adjacent a lower side of the core;
- wherein the second elongate spring member extends substantially from a nose portion of the surfboard to a tail portion of the surfboard, and wherein the second elongate spring member has a width which is greater than a thickness of the second elongate spring member.

Preferably the width is in the direction of rails of the surfboard. Preferably the surfboard further includes a first elongate spring member located adjacent an upper side of the core.

In one embodiment, the surfboard is a paddleboard.

In a further aspect, the present invention broadly resides in a surfboard having
- a core; and
- an elongate spring member substantially centrally located relative to the core,
- wherein the elongate spring member extends substantially from a nose portion of the surfboard to a tail portion of the surfboard.

Preferably the core is made predominantly from a foamed material. Preferably the core is a foam core. Preferably the foamed material is polyurethane foam. In another embodiment, the foam is polystyrene foam. Preferably the polystyrene foam is expanded polystyrene foam. Alternatively, the polystyrene foam can be extruded polystyrene foam.

Preferably the core includes two body portions. Preferable the two body portions are spaced from one another. The elongate spring member is preferably located between the two body portions. Preferably the two body portions are symmetrical about the elongate spring member.

Preferably the elongate spring member is located centrally relative to a longitudinal axis of the surfboard.

Preferably the elongate spring member includes a plurality of layers of resilient material. Preferably the number of layers of resilient material defines the thickness of the elongate spring member. Preferably the number of layers of resilient material is greater in a central portion of the elongate spring member compared to a portion of the elongate spring member towards the nose of the surfboard. Preferably the number of layers of resilient material is greater in a central portion of the elongate spring member compared to a portion of the elongate spring member towards the tail of the surfboard. Preferably the plurality of layers is between 2 to 12 layers of resilient material. More preferably the plurality of layers is between 4 to 10 layers of resilient material.

Preferably the plurality of layers of resilient material are bonded together to form the elongate spring member. More preferably the plurality of layers of resilient material are bonded together using an epoxy to form the elongate spring member. Preferably a thin portion of the elongate spring member is less than 50% of the thickness compared to a thick portion of the elongate spring member. Preferably the thin portion includes 1 to 2 layers of resilient material. Preferably the thick portion includes 4 to 10 layers of resilient material.

Preferably the plurality of layers of the elongate spring member are made of a resilient material. In one embodiment, the plurality of layers are made of a fibreglass composite material. Preferably the plurality of layers are made of a fibreglass and resin composite material. In another embodiment, the plurality of layers are made of a carbon fibre composite material. Preferably the plurality of layers are made of a carbon fibre and resin composite material. Preferably the fibre is substantially unidirectional. Preferably the fibre is substantially unidirectional in the longitudinal direction of the surfboard.

Preferably the elongate spring member is part of a spring assembly. Preferably the spring assembly includes an upper portion and a lower portion. Preferably the upper portion and the lower portion are at least partially spaced from one another by the elongate spring member.

Preferably the upper portion is made predominantly from a foamed material. Preferably the foamed material is polyurethane foam. In another embodiment, the foam is polystyrene foam. Preferably the polystyrene foam is expanded polystyrene foam. Alternatively, the polystyrene foam can be extruded polystyrene foam.

Preferably the upper portion has a thickness of substantially between 5 mm to 100 mm. Preferably the upper portion has a thickness of substantially between 10 mm to 80 mm. More preferably the upper portion has a thickness of substantially between 20 mm to 50 mm.

Preferably the lower portion is made predominantly from a foamed material. Preferably the foamed material is polyurethane foam. In another embodiment, the foam is polystyrene foam. Preferably the polystyrene foam is expanded polystyrene foam. Alternatively, the polystyrene foam can be extruded polystyrene foam.

Preferably the lower portion has a thickness of substantially between 5 mm to 100 mm. Preferably the lower portion has a thickness of substantially between 5 mm to 50 mm. More preferably the lower portion has a thickness of substantially between 10 mm to 20 mm.

Preferably each layer of the plurality of layers of resilient material of the elongate spring member has a different length. Preferably in use, the layer(s) of resilient material towards the lower portion is/are shorter than the layer(s) of resilient material towards the upper portion. Preferably the length of each layer of the plurality of layers of resilient material is substantially from 100 mm to 1800 mm. More preferably the length of each layer of the plurality of layers of resilient material is substantially from 250 mm to 1650 mm.

Preferably the elongate spring member tapers from a thicker portion to a thinner portion towards the nose of the surfboard. Preferably the elongate spring member tapers from a thicker portion to a thinner portion towards the tail of the surfboard. Preferably the elongate spring member tapers to a point at or towards the nose of the surfboard.

Preferably the elongate spring member has a width of substantially between 15 mm to 200 mm. Preferably the elongate spring member has a width of substantially between 15 mm to 80 mm. More preferably the elongate spring member has a width of substantially between 20 mm to 40 mm.

In one embodiment, the elongate spring member is pretensioned. Preferably the elongate spring member is pretensioned in a first direction. Preferably the elongate spring member is biased to bend upwardly in use. In another embodiment, the elongate spring member is pretensioned in a second direction. Preferably the elongate spring member is biased to bend downwardly in use.

Preferably the surfboard includes a shell layer. Preferably the shell layer substantially covers the core. Preferably the shell layer substantially covers the spring assembly. It will be understood that a shell layer may also be referred to as a skin layer. Preferably the shell layer includes a fibreglass and resin composite material. Alternatively or additionally the shell layer can include a carbon fibre and resin composite material. Preferably the shell layer is bonded to the core. Preferably the shell layer is bonded to the spring assembly.

Preferably the surfboard is between 170 cm to 260 cm in length. More preferably the surfboard is between 180 cm to 210 cm in length. Preferably the surfboard has a partially concave lower surface. Preferably the surfboard has a partially convex upper surface.

In another aspect, the present invention broadly resides in a spring assembly for a surfboard, including:
an elongate spring member, and
an upper portion and a lower portion at least partially spaced from one another by the elongate spring member,
wherein in use, the spring assembly is substantially centrally located in the surfboard.

Preferably the spring assembly extends substantially from a nose portion of the surfboard to a tail portion of the surfboard.

Preferably the elongate spring member includes a plurality of layers of resilient material. Preferably the number of layers of resilient material defines the thickness of the elongate spring member. Preferably the number of layers of resilient material is greater in a central portion of the elongate spring member compared to a portion of the elongate spring member towards the nose of the surfboard. Preferably the number of layers of resilient material is greater in a central portion of the elongate spring member compared to a portion of the elongate spring member towards the tail of the surfboard. Preferably the plurality of layers is between 2 to 12 layers of resilient material. More preferably the plurality of layers is between 4 to 10 layers of resilient material.

Preferably the plurality of layers of resilient material are bonded together to form the elongate spring member. More preferably the plurality of layers of resilient material are bonded together using an epoxy to form the elongate spring member. Preferably a thin portion of the elongate spring member is less than 50% of the thickness compared to a thick portion of the elongate spring member. Preferably the thin portion includes 1 to 2 layers of resilient material. Preferably the thick portion includes 4 to 10 layers of resilient material.

Preferably the plurality of layers of the elongate spring member are made of a resilient material. In one embodiment, the plurality of layers are made of a fibreglass composite material. Preferably the plurality of layers are made of a fibreglass and resin composite material. In another embodiment, the plurality of layers are made of a carbon fibre composite material. Preferably the plurality of layers are made of a carbon fibre and resin composite material. Preferably the fibre is substantially unidirectional. Preferably the fibre is substantially unidirectional in the longitudinal direction of the surfboard.

Preferably the upper portion is made predominantly from a foamed material. Preferably the foamed material is polyurethane foam. In another embodiment, the foam is polystyrene foam. Preferably the polystyrene foam is expanded polystyrene foam. Alternatively, the polystyrene foam can be extruded polystyrene foam.

Preferably the upper portion has a thickness of substantially between 5 mm to 100 mm. Preferably the upper portion has a thickness of substantially between 10 mm to 80 mm. More preferably the upper portion has a thickness of substantially between 20 mm to 50 mm.

Preferably the lower portion is made predominantly from a foamed material. Preferably the foamed material is polyurethane foam. In another embodiment, the foam is polystyrene foam. Preferably the polystyrene foam is expanded polystyrene foam. Alternatively, the polystyrene foam can be extruded polystyrene foam.

Preferably the lower portion has a thickness of substantially between 5 mm to 100 mm. Preferably the lower portion has a thickness of substantially between 5 mm to 50 mm. More preferably the lower portion has a thickness of substantially between 10 mm to 20 mm.

Preferably each layer of the plurality of layers of resilient material of the elongate spring member has a different length. Preferably in use, the layer(s) of resilient material towards the lower portion is/are shorter than the layer(s) of resilient material towards the upper portion. Preferably the length of each layer of the plurality of layers of resilient material is substantially from 100 mm to 1800 mm. More preferably the length of each layer of the plurality of layers of resilient material is substantially from 250 mm to 1650 mm.

Preferably the elongate spring member tapers from a thicker portion to a thinner portion towards the nose of the surfboard. Preferably the elongate spring member tapers from a thicker portion to a thinner portion towards the tail of the surfboard. Preferably the elongate spring member tapers to a point at or towards the nose of the surfboard.

Preferably the elongate spring member has a width of substantially between 15 mm to 200 mm. Preferably the elongate spring member has a width of substantially between 15 mm to 80 mm. More preferably the elongate spring member has a width of substantially between 20 mm to 40 mm.

Preferably the spring assembly has a thickness as same as an attached portion of a foam core of the surfboard.

In one embodiment, the elongate spring member is pretensioned. Preferably the elongate spring member is pretensioned in a first direction. Preferably the elongate spring member is biased to bend upwardly in use. In another embodiment, the elongate spring member is pretensioned in a second direction. Preferably the elongate spring member is biased to bend downwardly in use.

In a further aspect, the present invention broadly resides in a method of manufacturing a surfboard, including the steps of
  locating a spring assembly between two body portions of a surfboard core;
  shaping the two body portions to form the surfboard core; and
  covering the spring assembly and the surfboard core with a shell layer.

Preferably the step of locating a spring assembly between two body portions of a surfboard core is completed before shaping of the surfboard core. Alternatively the step of locating a spring assembly between two body portions of a surfboard core is completed after shaping of the surfboard core.

Preferably the method further includes step of shaping the spring assembly to conform to the surfboard core.

Preferably the spring assembly is a spring assembly as described in this specification.

Preferably the surfboard is a surfboard as described in this specification.

In one embodiment, the surfboard is a paddleboard.

The features described with respect to one aspect also apply where applicable to all other aspects of the invention. Furthermore, different combinations of described features are herein described and claimed even when not expressly stated.

BRIEF DESCRIPTION OF THE DRAWINGS

In order that the present invention can be more readily understood reference will now be made to the accompanying drawings which illustrate a preferred embodiment of the invention and wherein.

DETAILED DESCRIPTION OF THE PREFERRED EMBODIMENT

Figure 1:
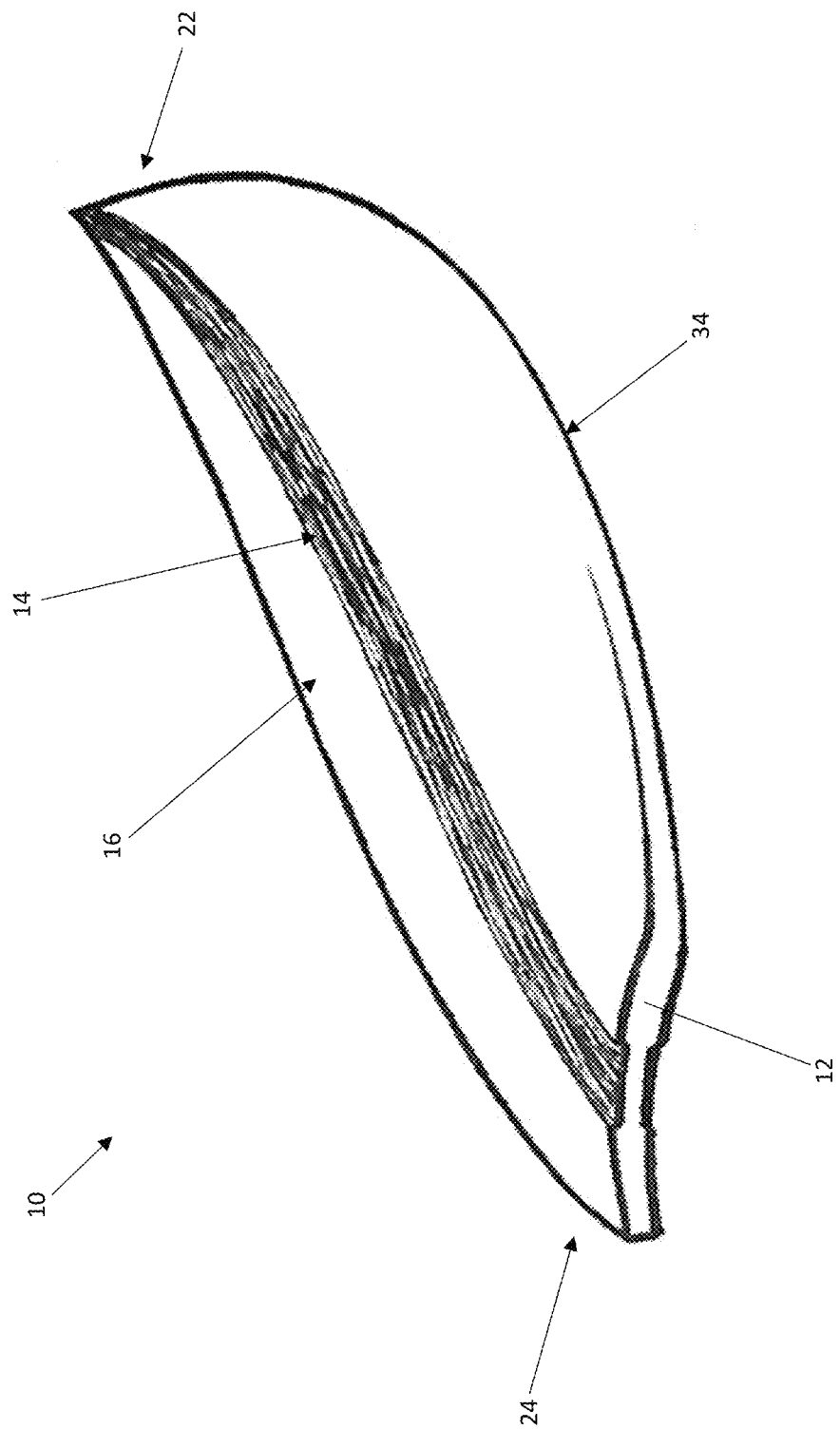
FIG. 1 is a perspective top view of a surfboard according to an embodiment of the present invention.
Figure 2:
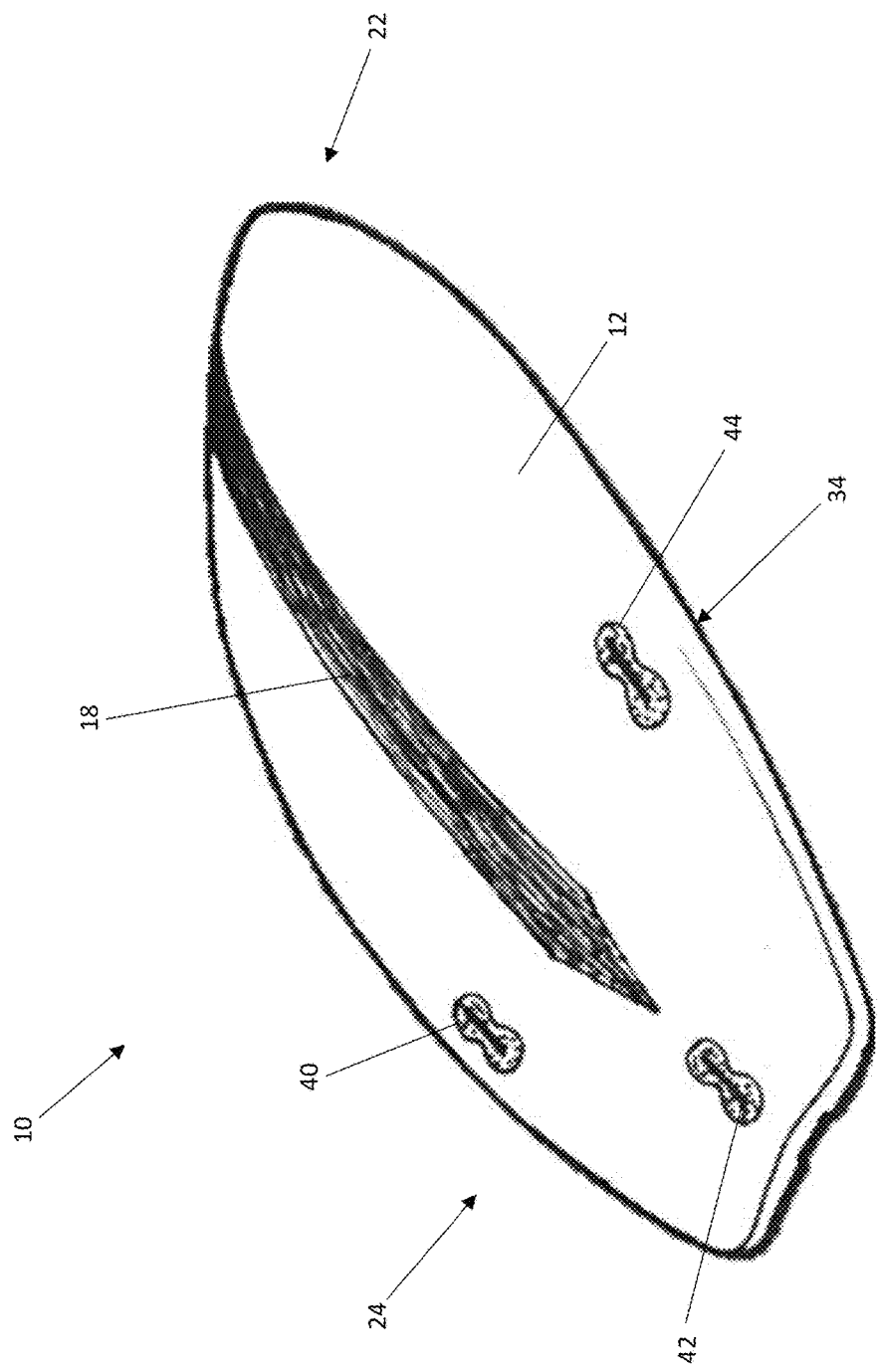
FIG. 2 is a bottom perspective view of the surfboard of FIG. 1.
Figure 3:
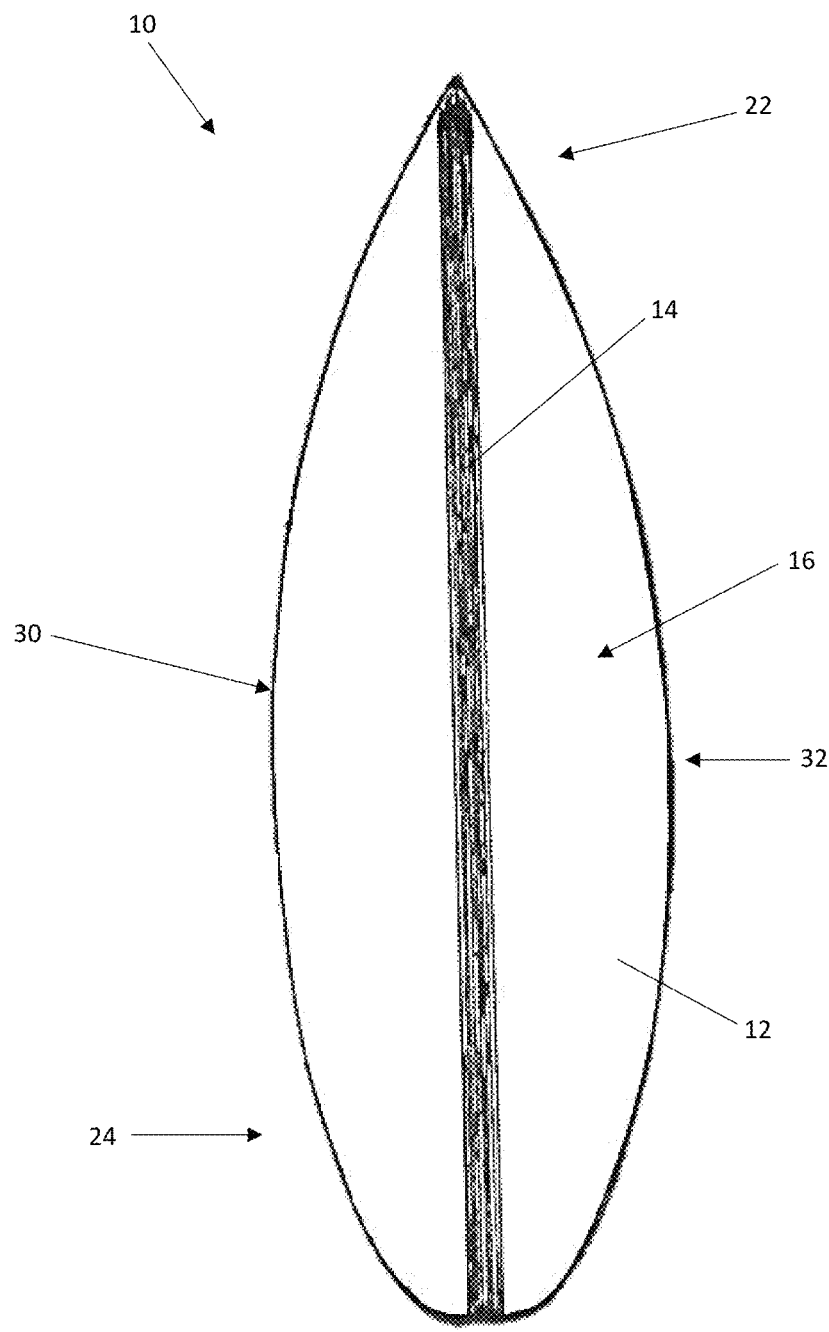
FIG. 3 is a top view of the surfboard of FIG. 1.
Figure 4:
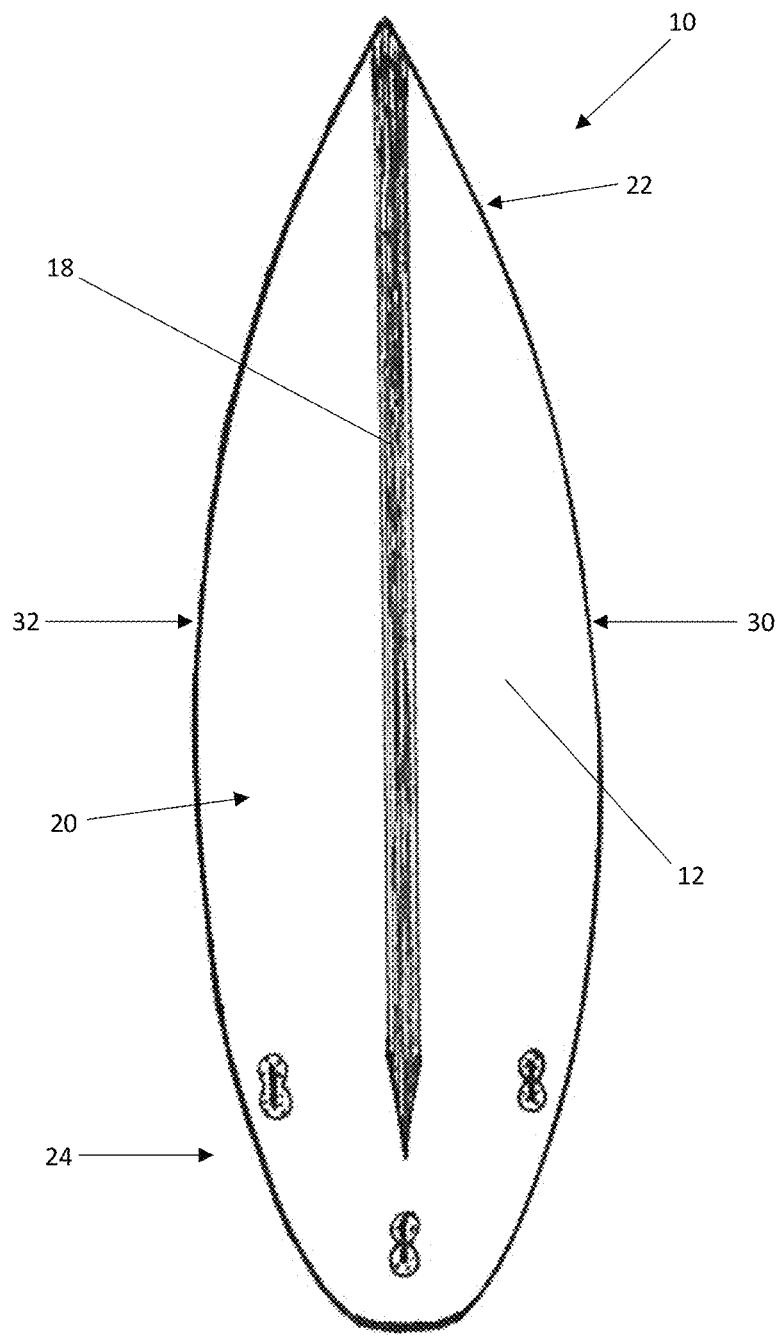
FIG. 4 is a bottom view of the surfboard of FIG. 1.

With reference to FIGS. 1-6 there is shown a surfboard 10. The surfboard 10 has a core 12 made of foamed polyurethane. A first elongate spring member 14 is located adjacent an upper side 16 of the core 12. The first elongate spring member 14 is made of a plurality of layers (best seen in FIG. 6) of unidirectional carbon fibre and resin. A second elongate spring member 18 located adjacent a lower side 20 of the core 12. The second elongate spring member 18 is made of a plurality of layers (best seen in FIG. 6) of unidirectional carbon fibre and resin.

Figure 5:
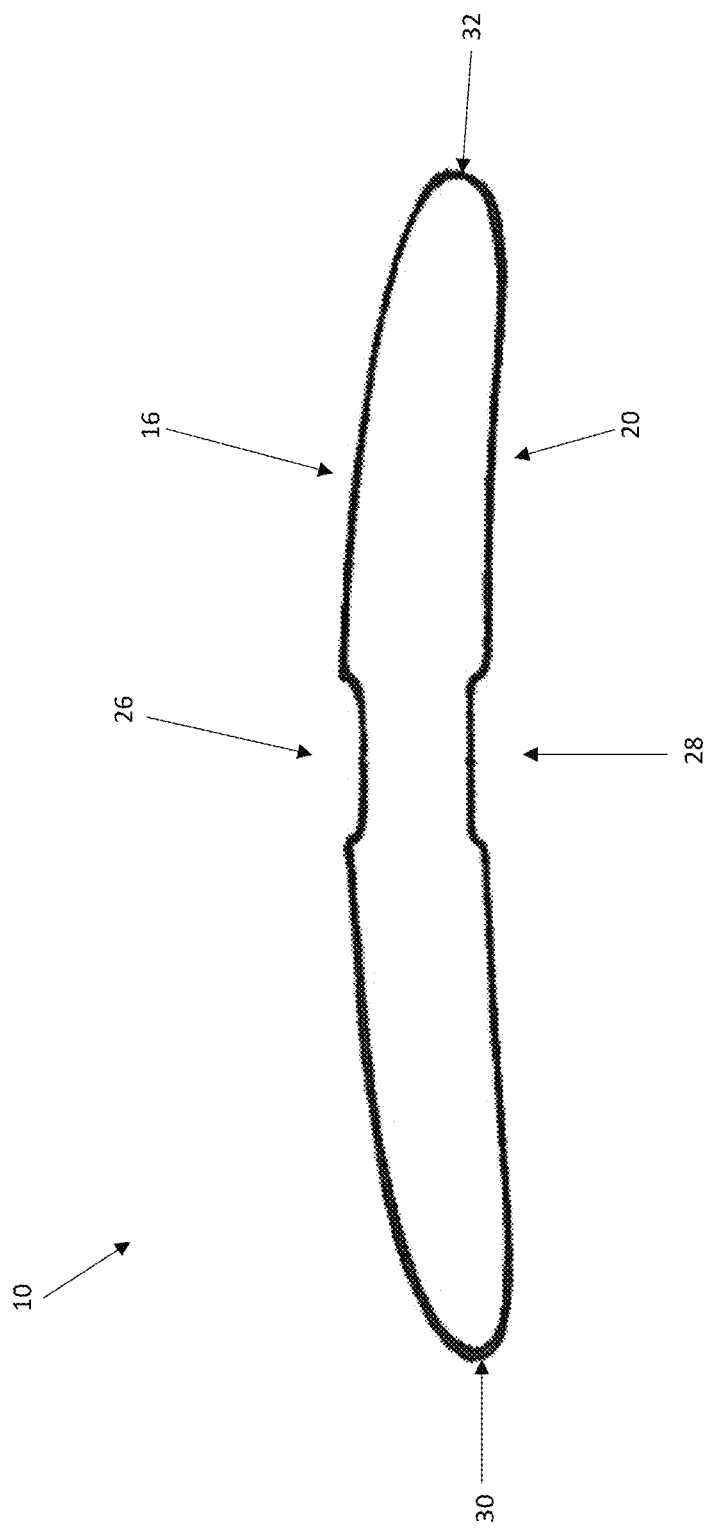
FIG. 5 is a lateral section view of the surfboard of FIG. 1.
Figure 6:
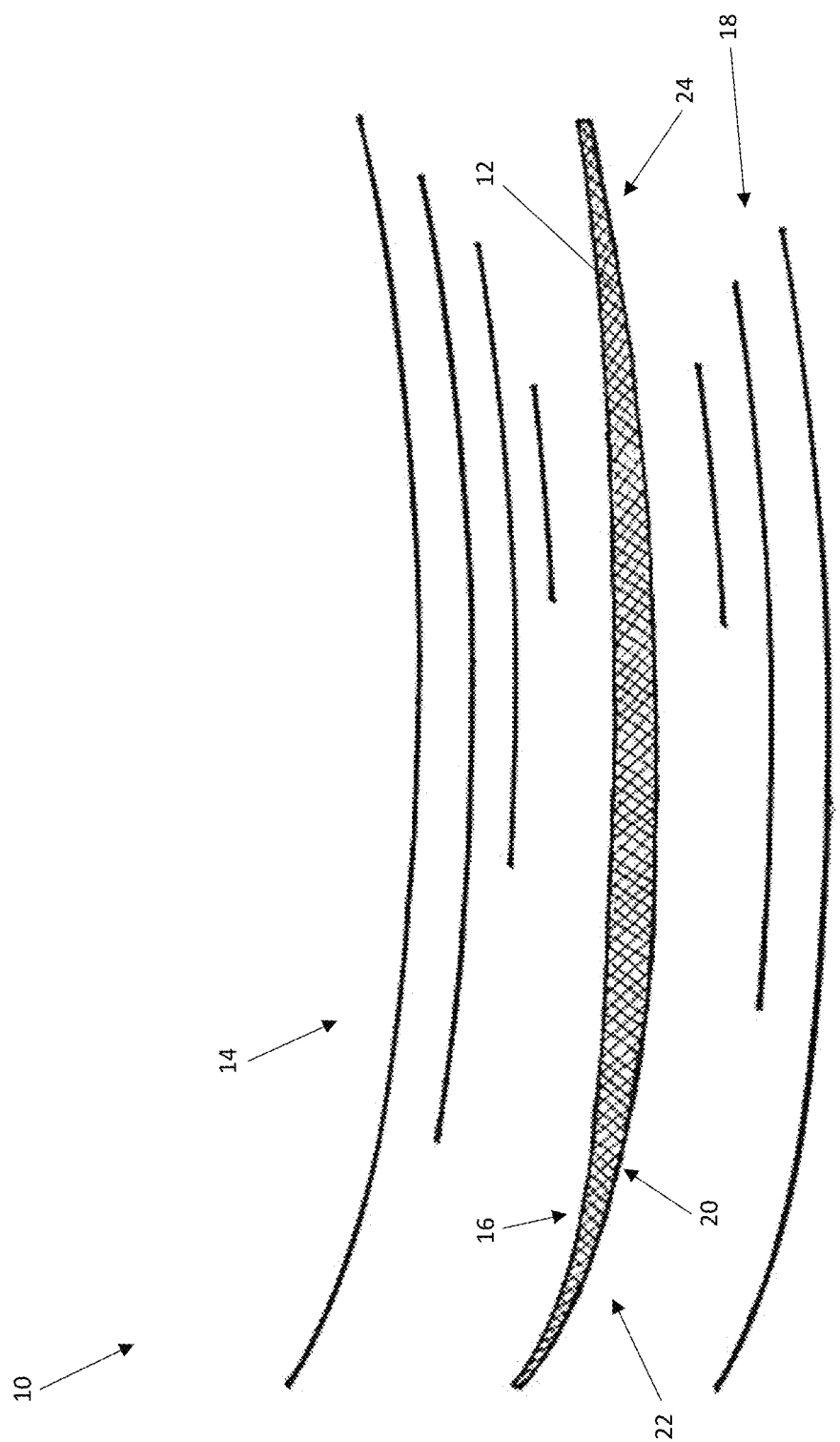
FIG. 6 is an exploded section view of the surfboard of FIG. 1.
Figure 7:
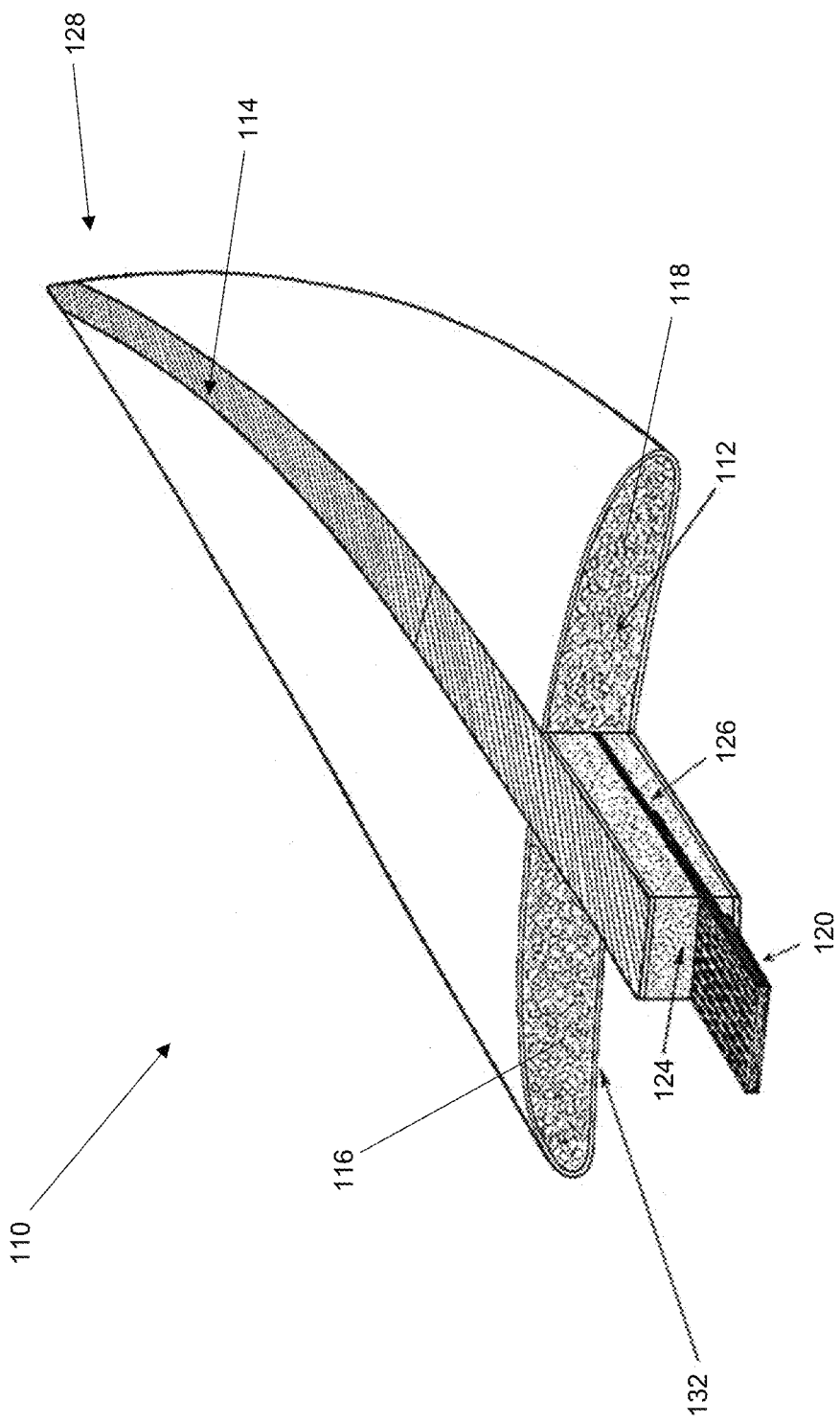
FIG. 7 is a section perspective view of a surfboard according to an embodiment of the present invention.
Figure 8:
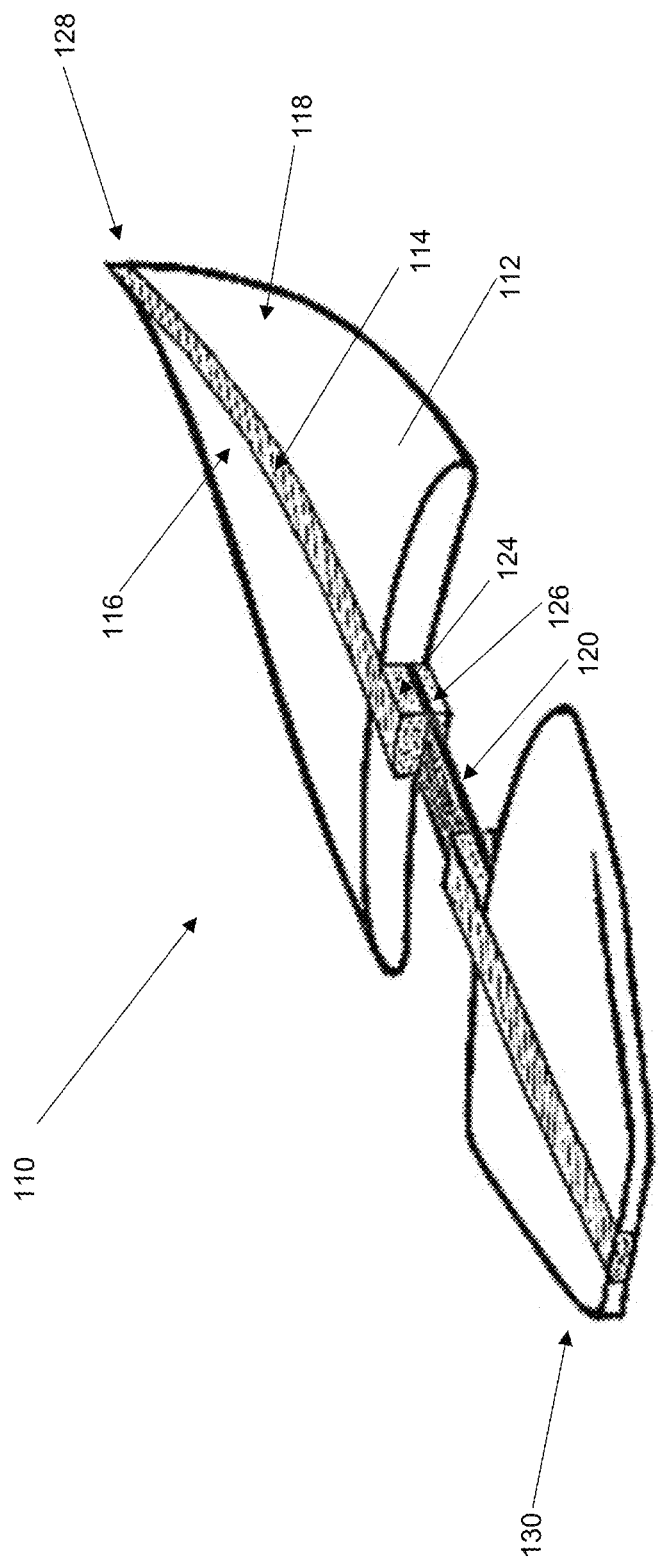
FIG. 8 is a section perspective view of the surfboard of FIG. 7.
Figure 9:
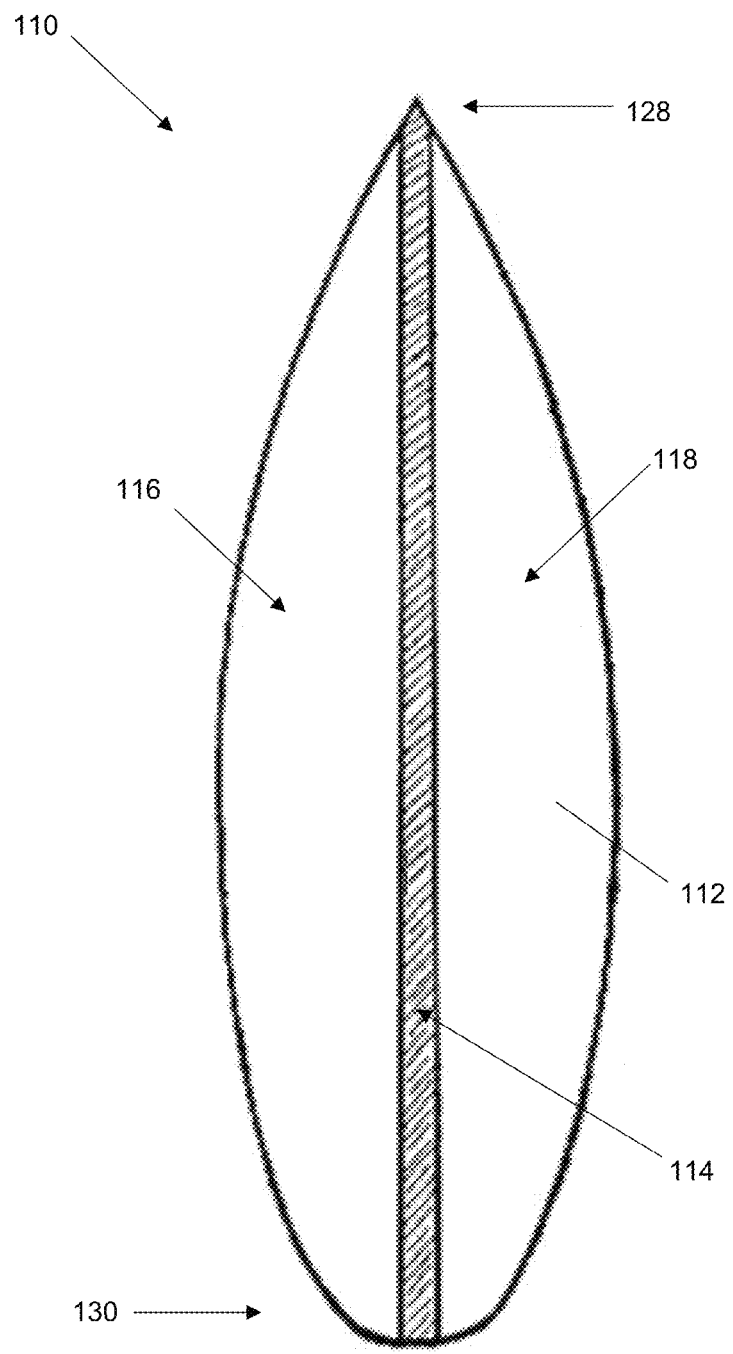
FIG. 9 is a top view of the surfboard of FIG. 7.
Figure 10:
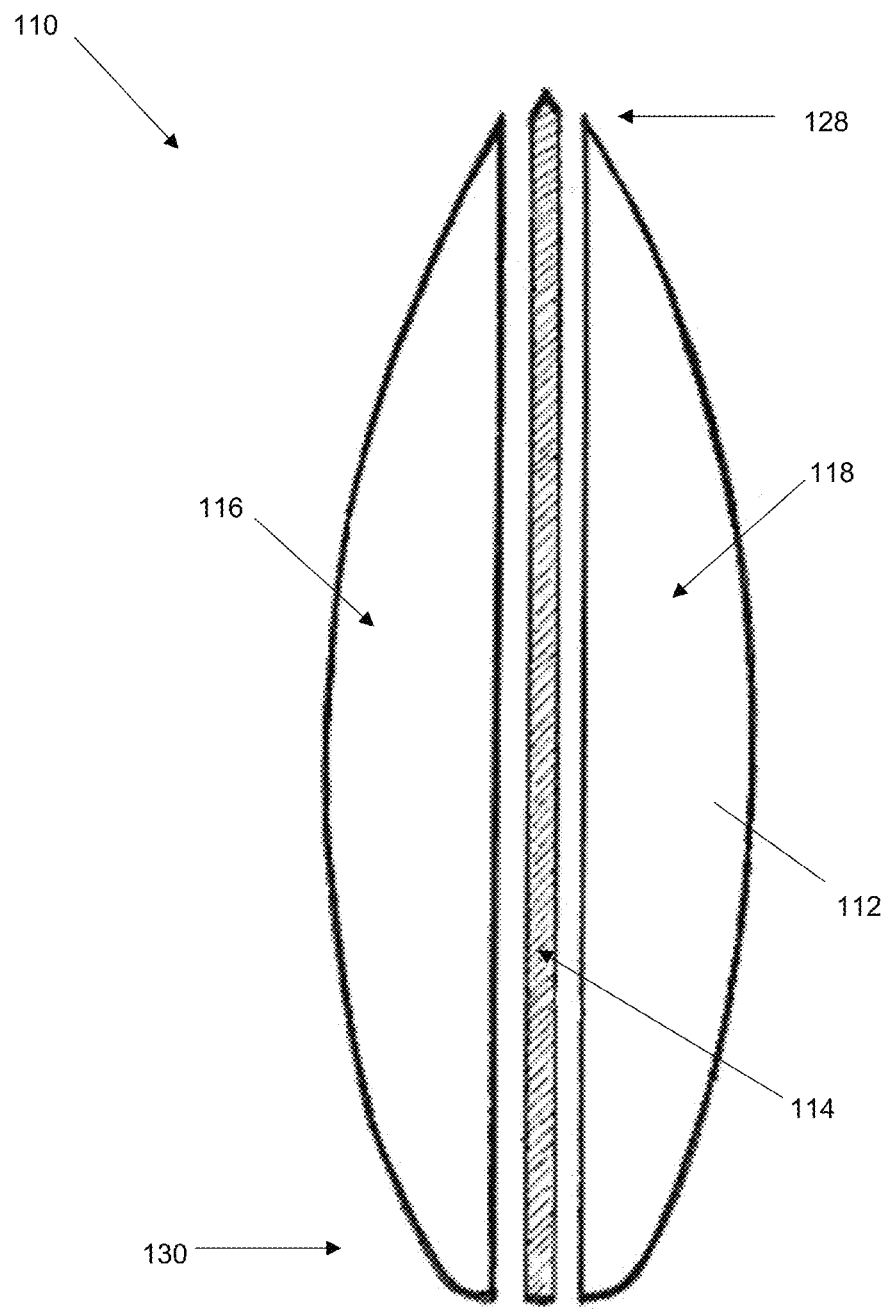
FIG. 10 is an exploded view of the surfboard of FIG. 7.
Figure 11:
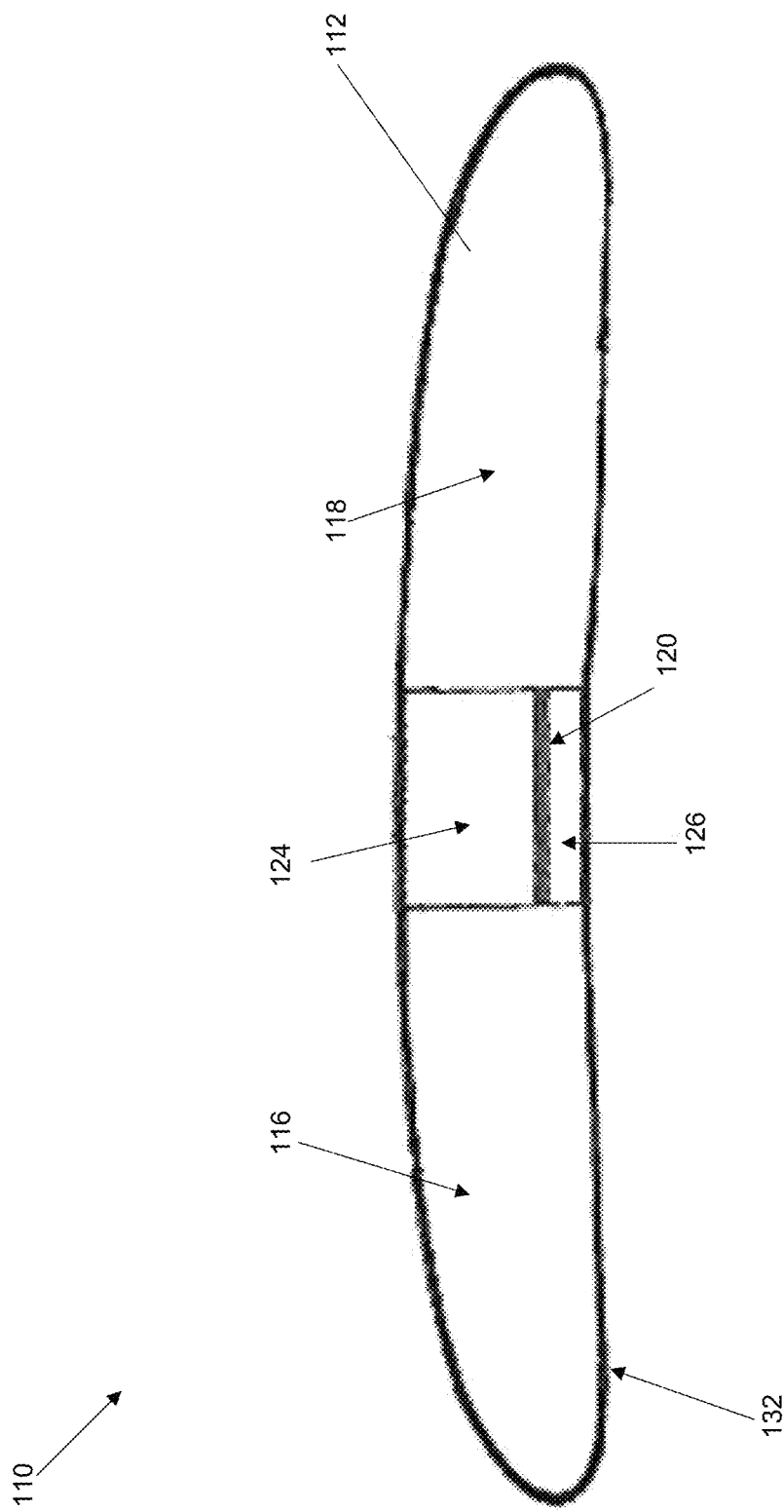
FIG. 11 is a section view of the surfboard of FIG. 7.

The first elongate spring member 14 extends from a nose portion 22 of the surfboard to a tail portion 24 of the surfboard 10. The first elongate spring member 14 is located in a centrally located channel 26 in the upper surface 16 of the surfboard 10 (FIG. 5 shows the channel 26 with the first elongate spring member 14 removed for clarity). The first elongate spring member 14 is formed in the channel 26 during the manufacture of the surfboard 10.

The first elongate spring member 14 has a width (in the direction of rails 30,32) that is greater than a thickness (depth) of the first elongate spring member 14.

The second elongate spring member 18 extends from a nose portion 22 of the surfboard to a tail portion 24 of the surfboard 10. The second elongate spring member 18 is located in a centrally located channel 28 in the lower surface 20 of the surfboard 10 (FIG. 5 shows the channel 28 with the second elongate spring member 18 removed for clarity). The second elongate spring member 18 is formed in the channel 28 during the manufacture of the surfboard 10.

The second elongate spring member 18 has a width (in the direction of rails 30,32) that is greater than a thickness (depth) of the second elongate spring member 18.

The surfboard 10 includes a shell layer 34 which covers the core 12, the first elongate spring member 14 and the second elongate spring member 18. The shell layer 34 is formed of a fibreglass and resin composite material.

The surfboard also includes a plurality of fin boxes 40,42,44. The fin boxes 40,42,44 are inserted into the core 12 prior to the shell layer 34 covering the core 12.

With reference to FIGS. 7-11, there is shown a surfboard 110 according to an embodiment of the present invention. The surfboard 110 has a core 112 made of expanded foamed polyurethane. A spring assembly 114 is centrally located relative to the core 112.

The core 112 includes two body portions 116,118. The spring assembly 114 is centrally located between the two body portions 116,118.

The spring assembly 114 extends from a nose portion 128 of the surfboard 110 to a tail portion 130 of the surfboard 110. The spring assembly 114 is formed before shaping of the surfboard 110.

The spring assembly 114 includes an elongate spring member 120 made of unidirectional carbon fibre and resin, an upper portion 124 and a lower portion 126. The upper portion 124 and the lower portion 126 are made of polystyrene foam.

The surfboard 110 includes a shell layer 132 which covers the two body portions 116,118 of the core 112 and the spring assembly 114. The shell layer 132 is formed of a fibreglass and resin composite material.

The surfboard 110 also includes one or more fin boxes (not shown). The fin boxes are inserted into the core 112 and/or the spring assembly 114.

Figure 12:
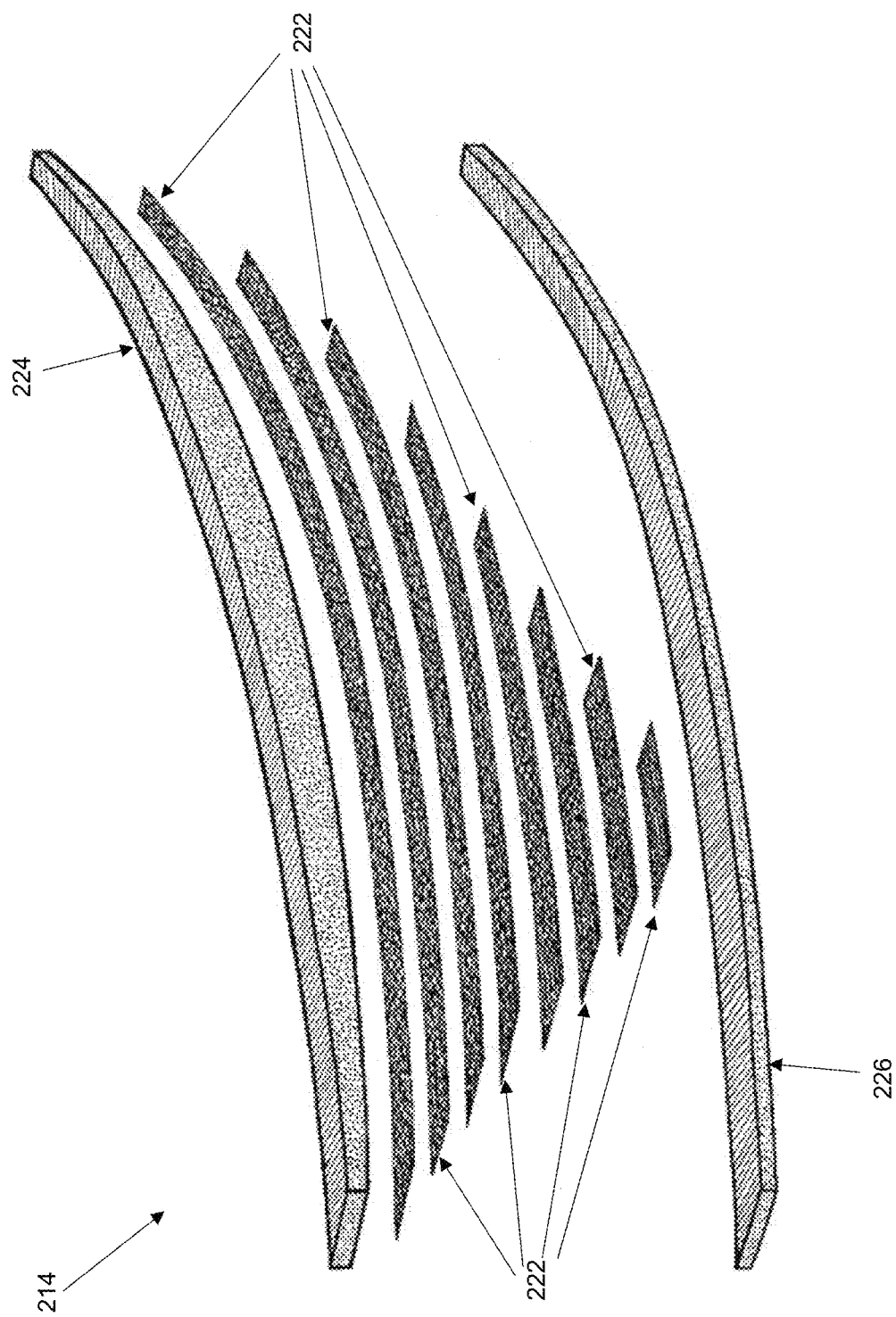
FIG. 12 is an exploded section view of a spring assembly according to an embodiment of the present invention.

With reference to FIG. 12, there is shown an exploded section view of a spring assembly 214 according to an embodiment of the present invention. The spring assembly 214 includes an elongate spring member 220, an upper portion 224 and a lower portion 226.

The elongate spring member 220 includes a plurality of layers 222. The plurality of layers 222 are made of unidirectional carbon fibre and resin. The plurality of layers 222 are bonded together to form the elongate spring member 220.

The number of layers 222 defines the thickness of the elongate spring member 220. The number of layers 222 is greater in a central portion of the elongate spring member 220 compared to the elongate spring member 220 towards a nose portion of a surfboard (not shown), and compared to the elongate spring member 220 towards a tail portion of the surfboard.

Each layer 222 of the elongate spring member 220 has a different length. As shown in FIG. 12, the layers 222 towards the lower portion 226 are shorter than the layers towards the upper portion 224.

Figure 13:
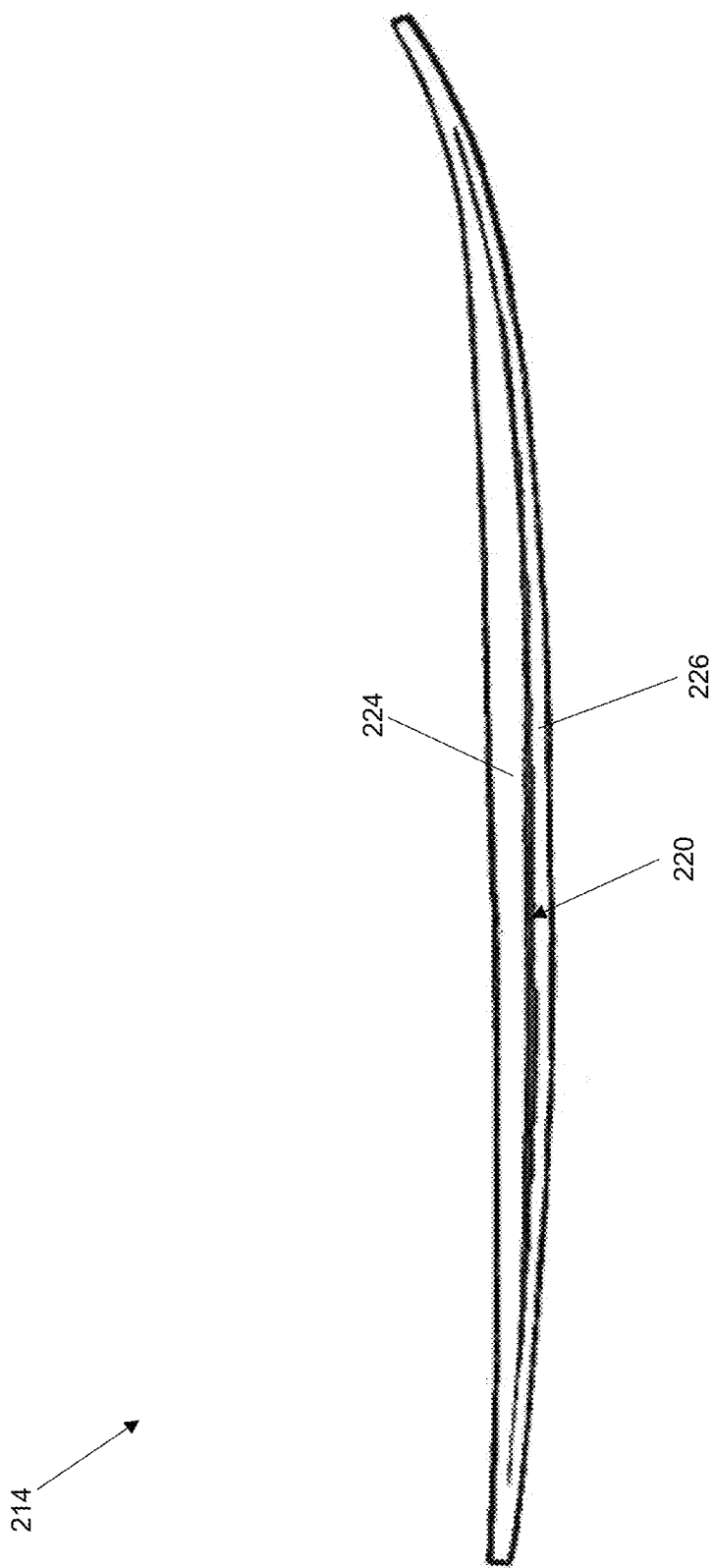
FIG. 13 is a side view of the spring assembly of FIG. 12.

With reference to FIG. 13, there is shown a side view of the spring assembly 214 of FIG. 12. The upper portion 224 and the lower portion 226 are spaced from one another by the elongate spring member 220.

Advantages

An advantage of the preferred embodiment of the surfboard includes providing desired flex whilst enhancing longitudinal strength. Another advantage of the preferred embodiment of the surfboard includes the ability to control the amount and location of the flex by positioning the plurality of layers of the first and/or second elongate spring members in a desired location during the manufacture of the surfboard. A further advantage of the preferred embodiment of the surfboard includes a reduction in torsional flex compared to a surfboard with a single centrally located stringer. Another advantage of the preferred embodiment of the surfboard includes the ability to control the amount of the flex by positioning the plurality of layers of the elongate spring member. A further advantage of the preferred embodiment of the surfboard includes that the spring assembly can be formed before or after shaping of the surfboard.

Variations

While the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. A surfboard having
a core;
a first elongate spring member located adjacent an upper side of the core; and
a second elongate spring member located adjacent a lower side of the core;
wherein the first elongate spring member extends substantially from a nose portion of the surfboard to a tail portion of the surfboard, and
wherein each elongate spring member includes a plurality of layers of resilient material, and wherein a number of layers of resilient material is greater in a central portion of the elongate spring member compared to a portion of the elongate spring member towards the nose of the surfboard and compared to a portion of the elongate spring member towards the tail of the surfboard.

2. The surfboard as claimed in claim 1, wherein the first elongate spring member is located within a channel in the upper side of the core, and the second elongate spring member is located within a channel in the lower side of the core.

3. The surfboard as claimed in claim 1, wherein each elongate spring member is made of a carbon fibre composite material and has a width that is greater than its thickness.

4. A surfboard having
a core; and
a first elongate spring member located adjacent an upper side of the core;
wherein the first elongate spring member extends substantially from a nose portion of the surfboard to a tail portion of the surfboard, and wherein the first elongate spring member has a width which is greater than a thickness of the first elongate spring member,
wherein the first elongate spring member includes a plurality of layers of resilient material, and wherein a number of layers of resilient material is greater in a central portion of the elongate spring member compared to a portion of the elongate spring member towards the nose of the surfboard and compared to a portion of the elongate spring member towards the tail of the surfboard.

5. The surfboard as claimed in claim 4 further including a second elongate spring member located adjacent a lower side of the core, wherein the second elongate spring member extends substantially from a nose portion of the surfboard to a tail portion of the surfboard, and wherein the second elongate spring member has a width which is greater than a thickness of the second elongate spring member,
and wherein the second elongate spring member includes a plurality of layers of resilient material, and wherein a number of layers of resilient material is greater in a central portion of the elongate spring member compared to a portion of the elongate spring member towards the nose of the surfboard and compared to a portion of the elongate spring member towards the tail of the surfboard.

6. A surfboard having
a core; and
a second elongate spring member located adjacent a lower side of the core;
wherein the second elongate spring member extends substantially from a nose portion of the surfboard to a tail portion of the surfboard, and wherein the second elongate spring member has a width which is greater than a thickness of the second elongate spring member, and wherein the second elongate spring member includes a plurality of layers of resilient material, and wherein a number of layers of resilient material is greater in a central portion of the elongate spring member compared to a portion of the elongate spring member towards the nose of the surfboard and compared to a portion of the elongate spring member towards the tail of the surfboard.

7. The surfboard as claimed in claim 6, further including a first elongate spring member located adjacent an upper side of the core, wherein the first elongate spring member extends substantially from a nose portion of the surfboard to a tail portion of the surfboard, and wherein the first elongate spring member has a width which is greater than a thickness of the first elongate spring member, and wherein the first elongate spring member includes a plurality of layers of resilient material, and wherein a number of layers of resilient material is greater in a central portion of the elongate spring member compared to a portion of the elongate spring member towards the nose of the surfboard and compared to a portion of the elongate spring member towards the tail of the surfboard.

8. A method of manufacturing a surfboard, including the steps of shaping a foam core;

forming a channel in a top surface of the foam core, the channel extending from a tail portion of the surfboard to a nose portion of the surfboard;

inserting a first elongate spring member in the channel in the top surface of the foam core, such that the first elongate spring member is located adjacent the top surface of the core, wherein the first elongate spring member includes a plurality of layers of resilient material, and wherein the number of layers of resilient material is greater in a central portion of the elongate spring member compared to a portion of the elongate spring member towards the nose of the surfboard and compared to a portion of the elongate spring member towards the tail of the surfboard; and covering the foam core and the first elongate spring member with a shell layer.

9. The method as claimed in claim 8 further including the step of forming a channel in a lower surface of the foam core, the channel extending from a tail portion of the surfboard to a nose portion of the surfboard, and further including the step of inserting a second elongate spring member in the channel in the lower surface of the foam core, such that the second elongate spring member is located adjacent the lower surface of the core.

10. The method as claimed in claim 8, wherein the surfboard comprises a core;

a first elongate spring member located adjacent an upper side of the core; and a second elongate spring member located adjacent a lower side of the core;

wherein the first elongate spring member extends substantially from a nose portion of the surfboard to a tail portion of the surfboard, and wherein each elongate spring member includes a plurality of layers of resilient material, and wherein the number of layers of resilient material is greater in a central portion of the elongate spring member compared to a portion of the elongate spring member towards the nose of the surfboard and compared to a portion of the elongate spring member towards the tail of the surfboard.

* * * * *